March 23, 1965   R. KOBLER ETAL   3,174,233
TEACHING MACHINE
Filed May 18, 1961   5 Sheets-Sheet 1

INVENTORS
RICHARD KOBLER
DAVID O. SMITH
BRUCE N. WHITLOCK
BY JOSEPH PETERPAUL

George H. Fritzinger
AGENT

*INVENTORS*
RICHARD KOBLER
DAVID O. SMITH
BRUCE N. WHITLOCK
BY JOSEPH PETERPAUL

George H. Fritjinger
AGENT

United States Patent Office 3,174,233
Patented Mar. 23, 1965

3,174,233
TEACHING MACHINE
Richard Kobler, West Orange, David O. Smith, Orange, and Bruce N. Whitlock and Joseph Peterpaul, Newark, N.J., assignors to McGraw-Edison Company, Elgin, Ill., a corporation of Delaware
Filed May 18, 1961, Ser. No. 110,980
14 Claims. (Cl. 35—9)

This invention relates to teaching machines of the question and hidden answer type wherein the student is provided with a writing space on a blank medium for each question brought into view and wherein after the student has written his answer he performs a manipulation which in the sequence named closes off his access to the writing space, reveals the correct answer and prepares the machine for bringing into view a succeeding question or problem.

It is an object of the invention to provide such teaching machine which is cheatproof as well as foolproof against misoperation.

It is another object to provide such teaching machine which is simple to operate.

Another object is to provide in such machine one tape medium bearing the teacher's questions and answers and a separate tape medium for receiving the student's written answers.

Another object is to provide a drive means in such machine successively operable to advance the tapes by steps through metered distances predetermined by the spaces on the tape for the successive questions and answers.

Another object is to provide access to the writing medium only after the question or problem is brought fully into view.

Another object is to control the area of the writing space for each question by a window openable after each step advance of the tapes only by the distance of that advance.

Another object is to declutch the drive means automatically when during advance of the tapes a length thereof predetermined by indicia on the tape is brought into view.

Another object is to close access to the writing medium and to thereupon reveal the teacher's answer to the student as an instant prior to clutching the tape drive means for a successive step advance of the tapes.

These and other objects and features of the invention will be apparent from the following description and the appended claims.

In the description of the invention reference is had to the accompanying drawings of which.

Figure 1:
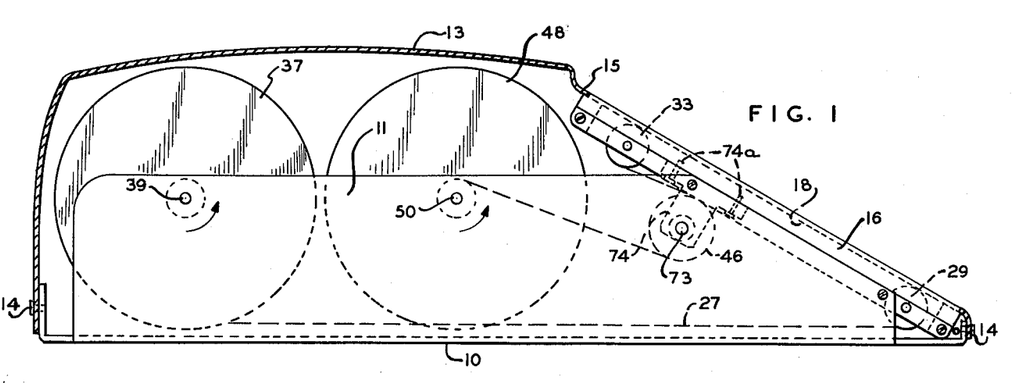
FIGURE 1 is a lefthand side elevational view of a teaching machine according to the invention taken substantially on the line 1—1 of FIGURE 14.

The teaching machine shown in the drawings has a housing of rectangular outline as viewed from the top (FIGURE 14) and has a substantially uniform height throughout its rear half portion sloping downwardly to the front throughout its front half portion (FIGURE 1). The housing comprises a base plate 10 having upstanding left and right side walls 11 and 12 (FIGURES 1 and 2) and a cover 13 of an inverted pan shape provided with vertical side walls which embrace the side walls of the frame and which are secured thereto as by screws 14. The top of the cover terminates in a bead or lip 15 at the rear edge of the front sloping wall.

Figure 6:
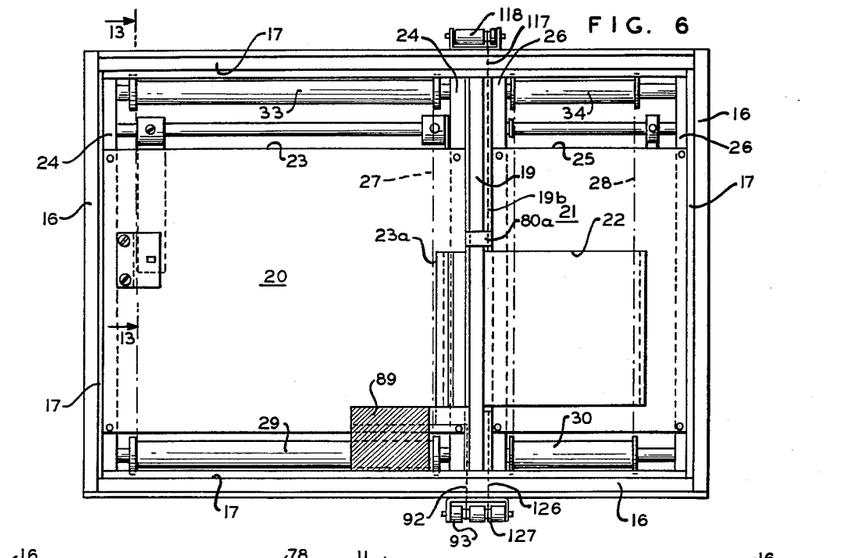
FIGURE 6 is a front view of the viewing panel taken on the line 6—6 of FIGURE 2.

The front sloping wall is surrounded by a rectangular frame or sash 16 (FIGURE 6) having an inner rabbeted edge 17 receiving a window pane 18 as of transparent glass or plastic to provide the machine with a viewing panel. The frame 16 has a front-to-back extending crossbar 19 at a distance about one-third the width of the machine from the right side thereof. This crossbar divides the panel into a larger lefthand portion 20 for exposing questions to the student and a narrower right-hand portion 21 for receiving answers to be written by the student through an opening 22 in the window pane 18.

Figure 7:
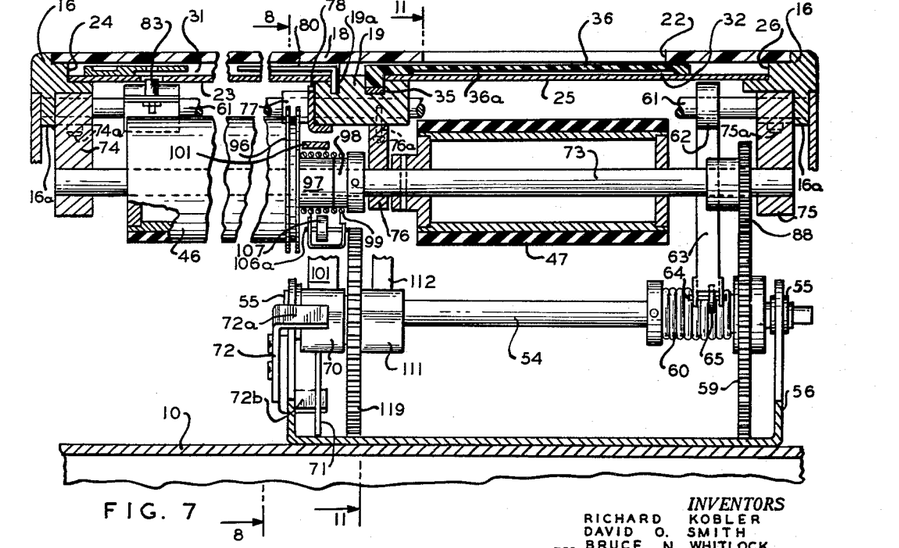
FIGURE 7 is a sectional view taken on the line 7—7 of FIGURE 8.
Figure 11:
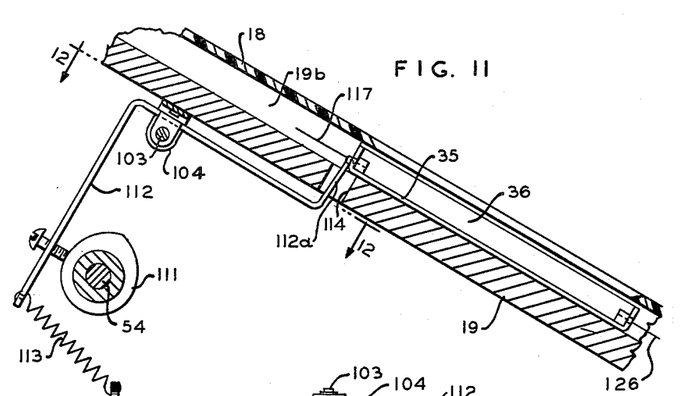
FIGURE 11 is a fractional sectional view taken on the line 11—11 of FIGURE 7.
Figures 12, 13, 14:
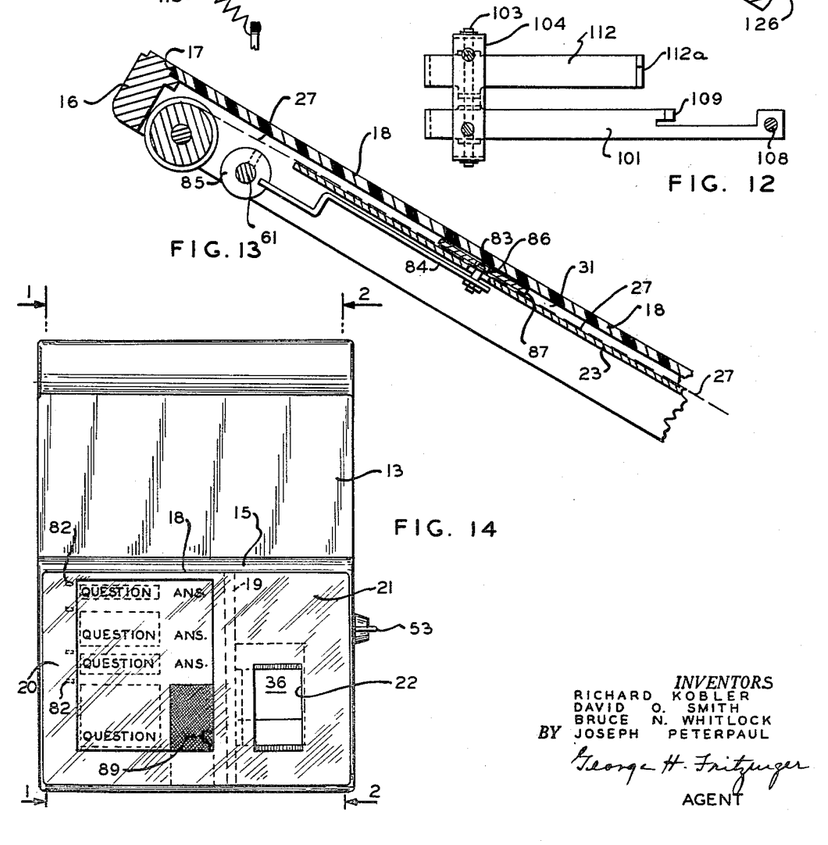
FIGURE 12 is a view taken on the line 12—12 of FIGURE 11.
FIGURE 13 is a vertical sectional view taken on the line 13—13 of FIGURE 6.
FIGURE 14 is a plan view of the machine.

The question panel 20 has a metal backing plate 23 spaced a slight distance back of the window pane 18 and mounted on rabbeted edges 24 on the left side of the frame 16 and on the crossbar 19. Likewise, the answer panel 21 has a metal backing plate 25 spaced slightly from the window pane 18 and mounted on rabbeted edges 26 on the crossbar 19 and on the right side of the frame 16. These backing plates terminate short of the front and back sides of the viewing panel to provide access for respective tapes 27 and 28 led into view at the bottom of the viewing panel around respective guide rollers 29 and 30. From these guide rollers the tapes are led upwardly through the spaces 31 and 32 between the window pane 18 and the backing plates 23 and 25 (FIGURES 7 and 8) and out of view at the top of the viewing panel around respective guide rollers 33 and 34. The tape 27 is a teaching tape bearing questions and answers printed crosswise thereof at successive distances along the tape as indicated in FIGURE 14, and the tape 28 is a blank tape for receiving answers of the student to be written through the opening 22. The tape 27 is approximately as wide as the question panel 20 and the tape 28 is only slightly wider than the opening 22. The writing or student's tape 28 is led upwardly between the backing plate 25 and a window 36 for closing access to the tape through the opening 22. To provide suitable clearance for the tape 28 the backwall of the window 36 is recessed at 36a (FIGURE 7). The window 36 slides in directions lengthwise of the tape 28 between the backing plate 25 and the window pane 18 to open and close the opening 22. As shown in FIGURES 7 and 11, a lefthand portion of the window 36 is embraced by a U-frame 35 guided in a channel 19b in the crossbar 19.

The teaching tape 27 and the student's tape 28 are supplied in roll form on respective reels 37 and 38 mounted on a transverse shaft 39 in the back portion of the machine. The shaft 39 is carried at its ends by respective bearings 40 and 41 mounted on the side walls 11 and 12 of the frame. The end portions of the shaft 39 are provided with flats 39a which are engaged by the bearings to hold the shaft from turning. A friction slip coupling is provided between the supply reels and the shaft 39 by means of a collar 42 pinned to the shaft between the reels and faced at its ends by clutch disks 43, and by collars 44 pinned to the outer end portions of the shaft 39 and compression springs 45 interposed between these collars and the reels. The compression springs press the reels inwardly against the respective clutch disks to hold the supply reels from free turning and possible unreeling of the supply rolls.

Figure 2:
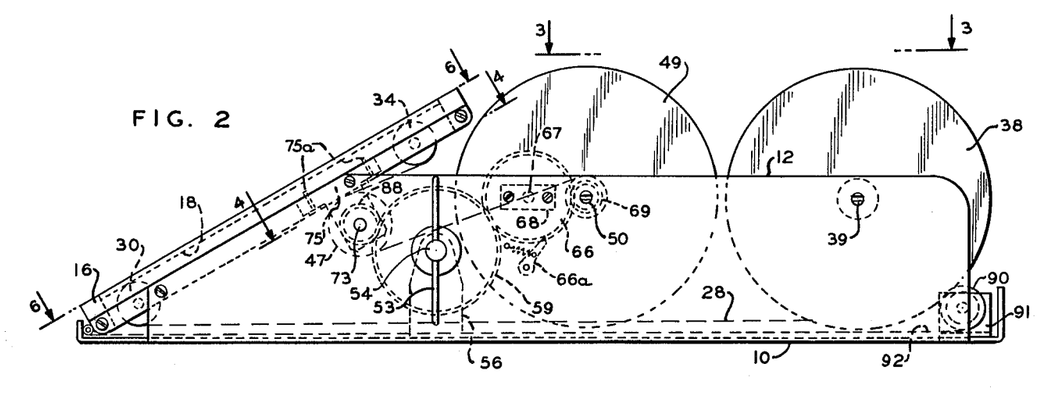
FIGURE 2 is a righthand elevational view of this teaching machine but with the cover removed and taken substantially on the line 2—2 of FIGURE 14.
Figure 4:
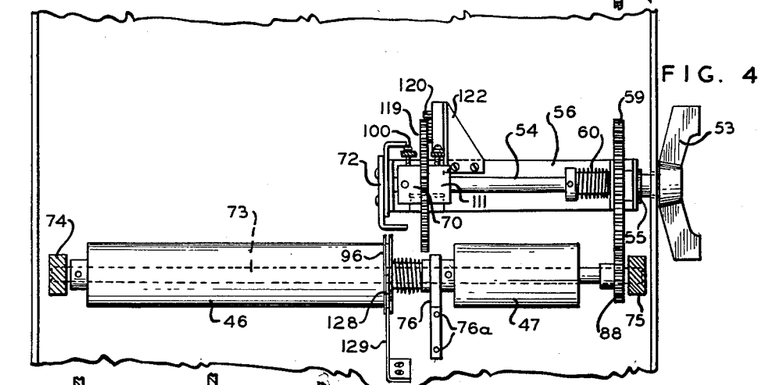
FIGURE 4 is a fractional plan view of a portion of the mechanism behind the front viewing panel of the machine taken substantially on the line 4—4 of FIGURE 2.
Figure 5:
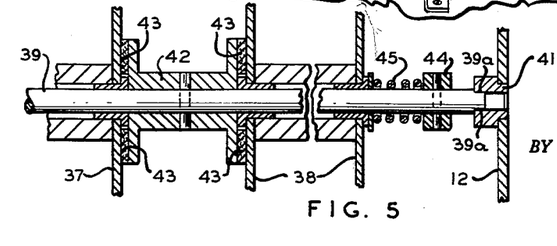
FIGURE 5 is a fractional sectional view through the tape supporting reels taken on the line 5—5 of FIGURE 3.
Figures 8, 9, 10:
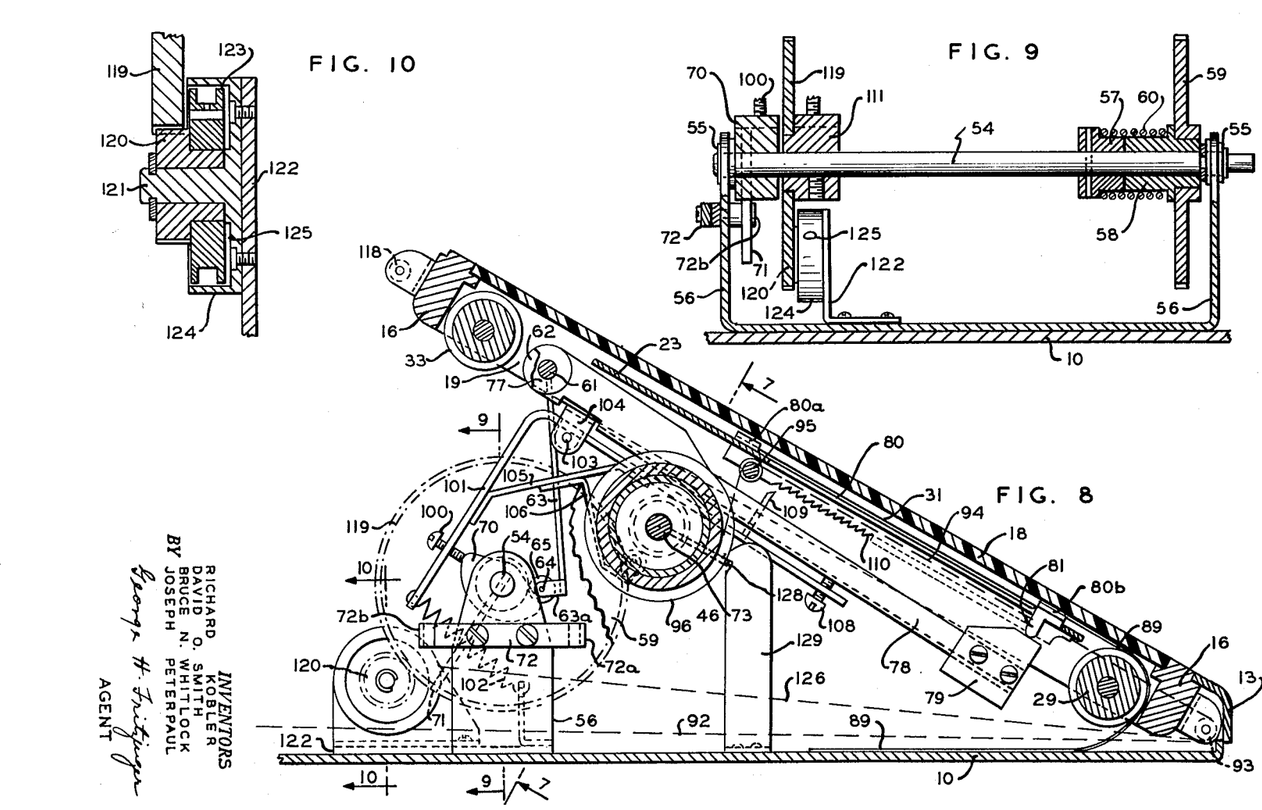
FIGURE 8 is a vertical sectional view taken on the line 8—8 of FIGURE 7.
FIGURE 9 is a vertical sectional view taken on the line 9—9 of FIGURE 8.
FIGURE 10 is a fractional sectional view taken on the line 10—10 of FIGURE 8.

The tapes 27 and 28 are unwound from the bottom of the reels 37 and 38 and drawn forwardly along the base plate 10 to the lower guide rollers 29 and 30 (FIGURE 1). As beforementioned, the tapes are led from the lower guide rollers through the space between the window pane 18 and the backing plates, and then around the upper guide rollers 33 and 34 and back into the machine. From the upper guide rollers the tape is led forwardly a short distance and then trained around respective feed rollers 46 and 47 (FIGURES 1, 2 and 7). After passing around the feed rollers the tape is led rearwardly to the respective take-up reels 48 and 49. The take-up reels are mounted ahead of the supply reels on a shaft 50 which is journaled at its ends in respective bearings 51 and 52 on the side walls 11 and 12. The take-up reels are secured by a frictional slip clutch to the shaft 50 in the manner in which the supply reels are secured to the shaft 35 with the use of similar elements given the same reference characters. However, the springs 45 are in this instance compressed to a greater extent to provide a stronger frictional grip between the take-up reels and the shaft 50 so that upon driving the shaft 50 the slip clutch theron will overpower the friction coupling of the supply reels to the shaft 39 and advance the tapes from the supply reels to the take-up reels through the circuitous path past the viewing panel as abovedescribed. The tapes are advanced by a drive means operable manually by a wing-type knob 53 at the right side of the machine. This knob is secured to a cross shaft 54 positioned below and to the front of the shaft 50 for the take-up reels. The shaft 54 spans a little over half the width of the machine (FIGURE 4) and is journaled at its ends in bearings 55 mounted in upstanding arms of a U-bracket 56 secured to the base plate 10. Pinned to the shaft 54 is a collar 57 axially abutting a slightly smaller diameter hub 58 of a gear 59 journaled on the shaft (FIGURE 9). Gripping the collar 57 is a band clutch spring 60 which embraces the hub 58 at a slight clearance therefrom. Positioned above the cross shaft 54 is a cross shaft 61 (FIGURE 8) to which is secured a collar 62 having a long depending arm 63 terminating to the front of the band clutch spring 60. On the terminal end of this arm there are turned over apertured ears 63a carrying a cross pin 64 on which is journaled a pressure roller 65. When pressure is exerted to turn the shaft 61 clockwise as it appears in FIGURE 8 the pressure roller 65 starts a frictional grip of the band clutch spring 60 onto the hub 58, which grip is tightened by the forward turning of the shaft 54 by the manual knob 53 in a counterclockwise direction as it appears in FIGURE 8. Through this clutch action of the band clutch spring 60 the gear 59 is secured to and turned in unison with the shaft 54.

The gear 59 meshes with an intermediate gear 66 journaled at 67 to a bracket 68 on the side wall 12, and the gear 66 meshes in turn with the pinion gear 69 secured to the shaft 50 of the take-up reels. A forward turning of the manual knob 53 in a clockwise direction as it appears in FIGURE 2 will therefore positively turn the shaft 50 also in a clockwise direction to wind the tapes 27 and 28 on the take-up reels. On a left-hand portion of the shaft 54 there is a cam 70 having a radially extending pin 71 which plays between two stop lugs 72a and 72b of a cross strip 72 secured to the upstanding left-hand leg of the frame bracket 56 (FIGURE 8). This stop means limits the shaft 54 and manual knob 53 thereon to a reciprocative movement through an angular travel of about 90°.

The shaft 61 is journaled at its ends in flanges 16a depending from the left and right side members of the window frame 16. Parallel to the shaft 61 is a shaft 73 for the feed rollers 46 and 47. This shaft is journaled at its ends in left and right standards 74 and 75 secured to the underside of the window frame 16 by respective screws 74a and 75a (FIGURES 1, 2 and 7) and is journaled at its center in a standard 76 secured by screws 76a to the underside of the crossbar 19 of the window frame. Secured to a central portion of the shaft 61 is a hub 77 having an arm 78 L-shaped in cross-section which extends forwardly parallel to the crossbar 19 and which has a cam member 79 mounted on the forward end portion thereof. A frame 80 movable along the arm 78 comprises an elongate member mounted slidably in a channel 19a provided in the upperside of the crossbar 19. This frame has a lug 80a turned over to the right at the upper end thereof and has an arm 80b turned over to the left at the lower end thereof. This lug 80a and arm 80b slidably engage the underside of the window pane 18 to confine the frame 80 in the channel (FIGURE 8). Depending from the arm 80b through a slit 23a in the backing plate 23 is a finger 81 which bears slidably against the top face of the cam member 79. By this cam engagement a force is exerted on the arm 78 in a clockwise direction as it appears in FIGURE 8 to flex the arm 63 secured to the shaft 61 and press the roller 65 against the band clutch spring 60 whereby normally to hold the drive clutch engaged so that when the student starts turning the knob 53 forwardly it will advance the tapes.

A feature of the present machine is in providing one of the tapes 27 and 28 with a punched hole 82 for each question spaced from the next succeeding hole by a predetermined distance depending upon the space on the tapes allocated to the question and the answer therefor. For example, such series of punched holes 82 are shown in the left border portion of the teaching tape 27 in FIGURE 14. At the start of each forward step movement of the tapes a punched hole 82 is in registration with a feeler pin 83 on an arm 84 having a hub 85 secured to the left-hand portion of the shaft 61. The feeler pin extends through an aperture in the backing plate 23 as shown in FIGURE 13 and is in registration with an opening 86 in a plate 87 interposed between the tape 27 and the window pane 18; however, at the start of a step advance of the tapes the arm 84 is displaced slightly clockwise by the engagement of the finger 81 with the cam 79 as just described so that the end of the feeler pin 83 is just flush with the bottom side of the tape. This permits the tape to be advanced without the feeler pin catching in the punched hole 82. As later described, the frame 80 is advanced with the tape 27 causing the finger 81 to soon ride free of the cam 79 but by this time the punched hole 82 at the feeler pin has been advanced therebeyond causing the feeler pin to come to bear slidably against an imperforate portion of the tape and to maintain thereby the shaft 61 in its clockwise position to hold the drive clutch 60 engaged. However, when the next succeeding hole 82 of the tape comes in registration with the feeler pin 83 the same will move in engagement with the hole to remove the pressure of the roller 65 from the drive clutch spring 60 and cause the clutch to become disengaged. This disengagement occurs before the knob 53 reaches the end of its forward stroke. The instant the drive clutch is so disengaged the knob 53 will be snapped forwardly through the remainder of its forward stroke against its limit stop 72a by the force being then exerted thereon. Although the knob 53 is advanced through its full stroke each time the student turns the knob to bring a new question into view the tapes are adavnced only by the distance allocated on the tapes for the respective question and its answer. This metered advance of the tapes during each step movement thereof by the distance allocated to the particular question and its answer eliminates the waste space which would occur were a set distance allocated for each question and its answer since the questions or problems and the answer thereto vary greatly in length.

Although the tapes are advanced by winding up the take-up reels the metered advance thereof is controlled by the feed rollers 46 and 47. This is because the feed rollers 46 and 47 are rubber tired and the tape is tensioned therearound by the advance of the take-up reels so that a non-slip driving grip is obtained between the feed rollers and the tape. The feed rollers are driven by the gear 59 meshing with a pinion gear 88 secured to the shaft 73. This drive of the feed rollers until the drive clutch 60 is disengaged controls the feed of the tape. The gear ratios between the shaft 54 and the feed roller shaft 73, and between the shaft 54 and the take-up reel shaft 50, are such that the shaft 50 is always over driven even when the tape is just starting to be wound onto the take-up reels. This over driving of the shaft 50 is permitted by the slip clutch between the shaft 50 and the take-up reels.

Figure 3:
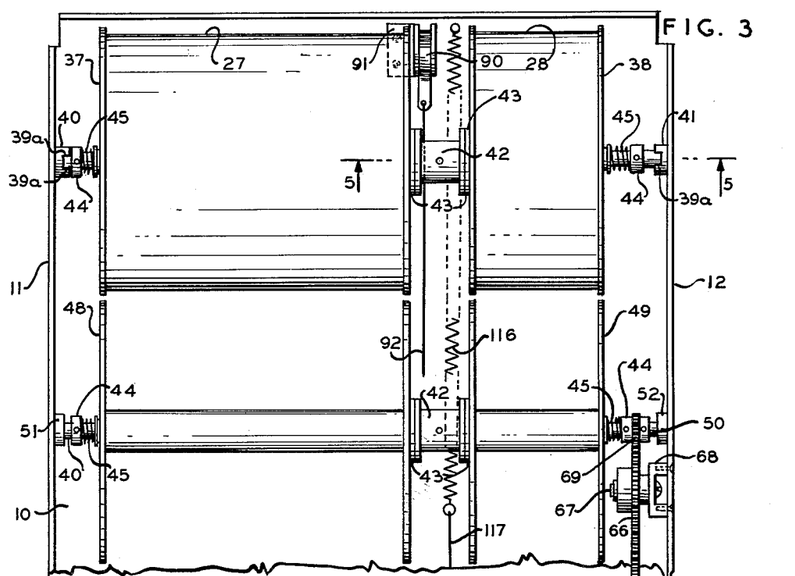
FIGURE 3 is a fractional plan view of the rear portion of the machine taken on the line 3—3 of FIGURE 2.

As indicated in FIGURE 14 the teaching tape 27 is provided at the right of each question with the correct answer. However, as the teaching tape is advanced to bring a new question into view an opaque shutter 89 is advanced along with the tape in line with the respective answer to conceal the correct answer from the student for the time being. This shutter is preferably in the form of a flexible piece of foil secured at its forward end to the arm 80b of the frame 80 and trailing from this arm around the guide roller 29 and back along the base plate 10 as shown in FIGURE 8. The frame 80 is normally held in its most forward position shown in FIGURE 8, corresponding to an open position of the shutter, by means of a coiled flat spring 90 journaled to a bracket 91 at the back of the machine between the supply roll reels 37 and 38 (FIGURE 3) and connected by a cord 92 leading forwardly along the base plate 10 and around a roller 93 at the front of the machine to the frame 80. Leading also from the back side of the frame 80 is another cord 94 trained around a roller 95 about midway up the viewing panel (FIGURE 8). The cord 94 is secured at its end to a narrow spool 96 mounted on the shaft 73 just to the right of the left feed roller 46 (FIGURE 7). The spool 96 has a hub 97 just slightly smaller in diameter than that of the adjacent portion of a collar 98 pinned to the shaft 73. Secured to this collar is a band clutch spring 99 which surrounds the slightly smaller hub 97 at a slight clearance therefrom normally to hold the clutch disengaged. The clutch is however engaged during the initial portion of the forward stroke of the manual knob 53 by means of the cam 70 on the shaft 54 (FIGURE 8). For instance, when the manual knob 53 is in its start position a pin or screw 100 of a lever 101 engages a high point of the cam 70 and holds the lever displaced in a clockwise direction as it appears in FIGURE 8 against the bias force of a tension spring 102. The lever 101 is L-shaped and provided with turned-over apertured ears near its apex which are pivoted on a cross pin 103 carried by a U-bracket 104 secured to the under side of the crossbar 19 of the window frame 16. This lever has a diagonal brace 105 provided with a radial arm 106 of a flexible material. The end portion of the arm 106 is provided with turned-over apertured ears which carry a cross pin 106a, on which is journaled a pressure roller 107 standing normally just free of the band clutch spring 99. During the initial advance of the manual knob 53 the cam 70 is moved free of the pin 100 and the spring 102 thereupon urges the pressure roller 107 against the clutch spring 99 to engage the clutch. This causes the spool 96 to be secured to the shaft 54 and to be turned therewith to wind up the cord 94 and advance the shutter 89 upwardly across the viewing panel in unison with the advance movement of the tapes 27 and 28.

Although the finger 81 is moved free of the cam 79 during the initial portion of the forward advance stroke of the shutter, the lever 78 is retained in the position shown in FIGURE 8 by the sliding engagement of the feeler pin 83 with the imperforate portion of the tape 27 between successive punched holes 82. However, when the next succeeding punched hole in the tape comes into registration with the feeler pin the shaft 61 is turned counterclockwise (FIGURE 8) by the spring 102 acting through the lever 101 and through a screw 108 in this lever in abutment with the under side of the arm 78. The counterclockwise movement of the shaft 61 disengages the drive clutch 60 as before-explained, and the concomitant counterclockwise movement of the lever 101 causes an upstanding tooth 109 thereof to engage a ratchet 110 in the under side of the frame 80 whereby to latch the shutter against any possible further upward movement. Furthermore, since the shaft 73 is constrained against backward movement by the one-way action of a ratchet pawl 66a engaging the gear 66 as shown in FIGURE 2, and the clutch 99 is held engaged by the spring 102 acting through the lever 101 and arm 106 after the drive clutch 60 is disengaged, the shutter 89 is also held constrained via the cord 94 from being moved in a downward direction.

When the knob 53 has been advanced to the end of its forward stroke determined by abutment of the pin 71 against the stop lug 72a (FIGURE 8) a cam 111 on the shaft 54 turns a second L-shaped lever 112 pivoted on the cross pin 103 (FIGURES 7, 11 and 12) against action of a spring 113 to disengage a latch finger 112a upstanding through an opening 114 in the crossbar 19 from the forward end of the frame 35 for the window 36. This window frame is biased to open position by a tension spring 116 between the supply reels 37 and 38 connected at one end to the base plate 10 and at the other end to a cord 117 (FIGURE 3) which is trained over a grooved roller 118 and led through the channel 19b to the back end of the frame 35. The instant the latch finger is disengaged from the frame 115 the window 36 is snapped by the spring 116 to an open position determined by its abutment against the lug 80a of the frame 80 for the shutter 89. Thus, the window 36 for the opening 22 is not opened until the shutter is latched and the knob is advanced to the end of its forward stroke, and then the window is snapped open only to the extent that the tapes and shutter have been advanced in bringing the last question into view. Since the writing window 36 is latched closed as the tapes and shutter 89 are advanced in unison to bring a succeeding question into view, the student is prevented from gaining access to the writing space allocated to the previous question during such advance of the tapes. Furthermore, since the shutter 89 is then latched in its advanced position and the window is next snapped open against an element of the shutter as a stop to limit the opening of the window to a position corresponding to that of the shutter, the student is prevented from gaining access to the writing space for the previous question after the next succeeding question has been brought fully into view. Thus, a student is prevented from ever changing his answer to a previous question after having seen any part or all of the next succeeding question.

From the foregoing description it is seen that when the knob 53 is in its most advanced position, the student sees the question just brought into view but not the correct answer and, moreover, the student has access to the writing tape 28 through the opening 22 to write his own answer to the question. Further, the viewing panel is long enough normally to reveal several of the previous questions together with the correct answers thereto and the answers which the student has written on the tape 28. While the machine is in this condition the student may attempt to foul the machine by putting his finger on the exposed portion of the window 36 and sliding it. The student can do this in a closing direction against the bias force of the tension spring 116 but as soon as he removes his finger the window will snap back to its open position. However, the student is prevented from moving the window 36 further open than its metered position corresponding to the positioning of the shutter because the window is stopped by abutment against the finger 80a of the frame 80 which is now in a latched condition as before explained.

Upon the student having written his answer through the opening 22 on the tape 28 he will take hold of the knob 53 and return it to its start position. During this return movement the drive clutch 60 is disengaged and no movement is imparted to the tapes. The shaft 54 is however returned with the knob 53 to turn the cams 70 and 111 back to their original positions. During the initial return movement the high point of the cam 111 rides free of the lever 112 causing the latch finger 112a to bear slidably against the under side of the window frame 35 and be ready to again latch the window frame as soon as it reaches its closed position. As the shaft 54 is returned a gear 119 secured thereto turns a pinion gear 120 journaled on a stud 121 secured to a bracket 122 on the base plate 10 (FIGURES 8 and 10). Secured to this pinion gear is a reel 123 enclosed by a cylindrical housing 124 having therein a peripheral opening 125. Wound on this reel is a cord 126 which leads through the opening 125 and around a grooved roller 127 at the front of the machine (FIGURE 6) through the channel 19b to the front end of the window frame 35. During the forward stroke of the manual knob 53 the reel is turned to pay out a slack length of the cord 126 and allow the window 36 to be snapped open by the spring 116 the instant it is unlatched. During the return stroke of the knob 53 the reel 123 takes up the cord 126 and draws the window gradually closed to its latched position. During this gradual return of the window, the shutter 89 remains latched in its closed position. In the final portion of the return stroke of the knob 53 after the window is latched closed, the lever 101 is shifted clockwise by the cam 70 to disengage the clutch 99 and allow the shutter to be snapped to its open position by the spring 90 whereby to expose the correct answer to the question last brought into view but only after the window 36 is latched closed. As the shutter is moved to its open position the finger 81 cams the arm 78 clockwise (FIGURE 8) and reengages the drive clutch 60 to prepare the machine for a next succeeding advance of the tapes. The open position of the shutter is defined by abutment of a radial pin 128 on the spool 96 against an arm of a bracket 129 upstanding from the base plate 10 as shown in FIGURE 8.

In summary, it will be apparent from the foregoing description that as the knob 53 is moved manually through its forward stroke the tapes 27 and 28, and the shutter 89, are advanced in unison through a predetermined distance determined by the spacing of the holes in the tape 27, and then the writing window 36 is unlocked and snapped open to a position corresponding to the advanced positioning of the shutter 89. When the knob 53 is next moved manually through its return stroke, the writing window 36 is gradually closed and latched when it reaches its closed position. The shutter 89 is next snapped open to reveal the teacher's answer so that the student may compare it with his written answer, and simultaneously as the shutter is snapped to open position the tape drive mechanism is prepared to enable the tapes to be advanced again responsive to a movement of the knob 53 through its forward stroke.

During the forward stroke of the manual knob 53, it would require a special effort upon the part of the student not to advance the knob to the very end of its forward stroke after the drive clutch 60 is released because of the forward pressure then being exerted on the knob to advance the tapes. However, until he does so advance the knob to the end of its forward stroke the window 36 is not open to provide him with a chance to write an answer to the question last brought into view. On the return stroke of the knob the student is required to turn the knob to its start position because until this is done the shutter is latched closed and the drive clutch 60 is disengaged to prevent the tapes from being advanced through a succeeding step movement. Moreover, each advance of the tape is predetermined by the spacing of the punched holes to prevent the tapes from getting into and out of phase relationship wherein only a portion of a question or problem is brought into view. Thus, the machine is not only cheatproof but also foolproof against misoperation by the student.

The embodiment of our invention herein particularly shown and described is intended to be illustrative of the invention and not limitative thereof since this embodiment is subject to many changes and modifications without departure from the scope of our invention, which we endeavor to express according to the following claims.

We claim:

1. In a teaching machine: the combination of a teaching tape having successive questions or problems in one column and respective answers in another column along the tape, a student's tape for receiving written answers to said questions or problems, a housing for said tapes having a first opening for exposing said respective questions and answers and a second opening for providing access to respective portions of said student's tape, means supporting said tapes for movement past said respective openings, drive means repeatedly operable to advance said tapes by successive step movements to bring successive questions or problems into view and to provide access to successive portions of said student's tape, manually reciprocable means having a one-way coupling with said drive means for actuating the drive means to advance the tapes by one step as the manual means is moved through its forward stroke and to prepare the drive means for a succeeding actuation as the manual means is moved through its return stroke, means moved by said drive means for concealing the answer to each question or problem as the same is brought into view, a movable window for said second opening, and means operatively coupled to said manually reciprocable means and operated by the same during the return movement thereof to prepare the drive means for a succeeding step advance of said tapes for closing said window to remove access to said student's tape and thereupon shifting said concealing means to reveal the answer to the problem last brought into view.

2. In a teaching machine: the combination of a reel for a supply roll of teaching tape having successive questions or problems in one column and respective answers in a second column along the tape, a reel for a supply roll of student's tape adapted for receiving written answers to said questions and problems, a take-up reel for each of said tapes, a viewing panel for exposing a predetermined length of each of said tapes, said viewing panel having an opening for providing access to said student's tape, a transparent window movable to open and close said opening, a shutter for said teacher's answers shiftable between open and closed positions, reciprocable manual means having a drive coupling with said tapes for advancing said teacher's tape by a distance sufficient to expose to view a succeeding question or problem and for advancing concurrently a corresponding portion of said student's tape, as said manual means is moved through its forward stroke, means responsive to said manual means as the same is moved through its forward stroke for closing said shutter and for opening said window, and means controlled by said manual means as the manual means is moved through its return stroke for first closing said window and thereupon opening said shutter.

3. The combination set forth in claim 2 wherein said shutter and window are mounted for reciprocative movement in directions lengthwise of said respective tapes including means for advancing said shutter in unison with said teacher's tape to maintain concealment of the teacher's answer as the respective question or problem is moved into view, means for opening said window with a snap movement as said manual means reaches the end of its forward stroke, means responsive to returning said manual means for gradually closing said window, and means responsive to said manual means for latching said window closed and for opening said shutter with a snap movement in the sequence here named as said manual means is returned to its start position.

4. In a teaching machine: the combination of a reel for a supply roll of teaching tape having successive questions or problems in one column and respective answers in a second column along the tape, a reel for a supply roll of student's tape adapted for receiving written answers to said questions or problems, a take-up reel for each of said tapes, a viewing panel for exposing a predetermined length of each of said tapes, said viewing panel having an opening for providing access to said student's tape, a window movable to open and close said opening, a shutter for said teacher's answer shiftable into open and closed positions, means biasing said window open, a latch for holding said window closed, manually reciprocable means having a drive coupling with said tapes for advancing the tapes as the reciprocable means is moved through a first portion of its forward stroke, a drive coupling between said manually reciprocable means and said shutter for advancing said shutter in unison with an advance movement of said tape to maintain concealment of a teacher's answer as the respective question is brought into view, means for disconnecting said drive couplings when said manually reciprocable means has been moved through a first portion of its stroke sufficient to bring a question fully into view, and means operable by said manually reciprocable means when the same is moved to the end of its forward stroke for unlatching said window.

5. The combination set forth in claim 4 including means operated by said manually reciprocable means during a return stroke movement thereof for gradually closing said window into a latched closed position, and means responsive to said manually reciprocable means during a final return movement thereof to its start position for opening said shutter.

6. The combination set forth in claim 5 wherein said viewing panel has a length sufficient to expose simultaneously a plurality of successive questions or problems and said window is openable to provide access only to a length of student's tape equal to the length of the space provided on the teacher's tape for the last of the questions brought into view.

7. In a teaching machine: the combination of a supply roll of teaching tape bearing successive questions or problems spaced lengthwise of the tape, said questions having varying lengths requiring varying lengths of the tape, a viewing panel across which said tape is advanced to bring said questions successively into view, indicia on said tape spaced by the distances along the tape of the successive questions, drive means for said tape operable repeatedly to advance said tape by steps, and means controlled by said indicia for limiting each step movement of the tape by said drive means to a distance equal to the length allocated on the tape for the respective question, wherein said drive means includes a manually reciprocable member, a drive clutch, means responsive to moving said manually reciprocable member into a start position for engaging said drive clutch, and means controlled by said indicia during the forward stroke of said manually reciprocable member for disengaging said drive clutch when the teaching tape has been advanced by a distance equal to said allocated length.

8. The combination set forth in claim 7 wherein said tape bears answers to said questions positioned laterally of the respective questions, a shutter, clutch means coupled to said drive means for moving said shutter in unison with each step movement of the tape to conceal the answer to the question being brought into view, and one-way limiting means operatively connected to said drive means for allowing said drive means to be moved only in a forward direction and for holding said shutter in its closed position after each step advance of the tape.

9. The combination set forth in claim 8 including a student's tape for receiving written answers to said questions, means for moving said student's tape in unison with said teacher's tape, a window movable in a forward direction lengthwise of the student's tape to provide access to the tape and movable in a reverse direction to close off said access to the tape, means controlled by said manual means as the manual means is moved through an end portion of its forward stroke for opening said window, and means connected to said shutter for limiting the open position of said window to a position corresponding to said advanced position of said shutter.

10. The combination set forth in claim 9 including means biasing said shutter into open position, a latch for holding said window closed, and means responsive to said manual means as the same is moved through its return stroke for moving said window to closed position and for thereupon disengaging said clutch means to free said shutter to be snapped to open position by said biasing means.

11. In a teaching machine: the combination of a reel for a supply roll of teaching tape having successive questions or problems in one column and respective answers in a second column along the tape, a reel for a supply roll of student's tape adapted for receiving written answers to said questions, a viewing panel for said tapes, at least one of said tapes having punched holes spaced therealong by the distances allocated to the successive questions, drive means repeatedly operable for advancing said teacher's tape and said student's tape by steps through respective distances depending on the spacing of said punched holes, manually operable reciprocable means for actuating said drive means during each forward stroke thereof a shutter for concealing the correct answer on said teacher's tape as a respective question is brought into said viewing panel, means for advancing said shutter in unison with each step advance of the teacher's tape, means responsive to said manual means at completion of each forward stroke thereof for opening said window through a distance equal to the distance of advance of the shutter; and means operable by said manually reciprocable means during the return stroke thereof for first closing said window and thereupon opening said shutter whereby to reveal the correct answer to the question last brought into view after access to the portion of the student's tape provided for receiving an answer to said question is removed.

12. The combination set forth in claim 11 including a clutch between said drive means and the tape, a feeler member slidably engaging the tape in the path of said punched holes, means controlled by said feeler member for disengaging said clutch when during advance of the tapes said feeler member comes into registration with a punched hole, and means responsive to the opening of said shutter for reengaging said clutch.

13. In a teaching machine: the combination of a teaching tape bearing successive questions or problems positioned along the tape, said tape having also respective answers to said questions positioned laterally of the respective questions, a student's tape for receiving written answers to said questions, a housing for said tapes having a first opening for exposing said respective questions and answers and a second opening for providing access to respective portions of said student's tape, means supporting said tapes for movement past said respective openings, means for advancing said tapes in unison by step movements to bring successive questions into view, a shutter, means controlled by said advancing means for moving said shutter in unison with the advance movement of said tapes to conceal the answer to a question as the question is brought into view, a window for said second opening held normally closed to prevent access to said student's tape, and means responsive to said advancing means at the completion of each step advance of said tapes for opening said window to an extent equal to the distance of the last step advance of the tapes.

14. The combination set forth in claim 13 including means for latching said shutter in its advanced position at the completion of each step advance of said tapes, said shutter having a stop element for limiting the opening movement of said student's window to a corresponding position therewith, means for latching said student's window closed, means operated by said advancing means for unlatching said student's window at the completion of a step advance of said tapes, and means biasing said student's window open to cause the same to be snapped against said stop element when the window is unlatched.

References Cited by the Examiner
UNITED STATES PATENTS

| | | | |
|---|---|---|---|
| 2,169,266 | 8/39 | Matter | 35—9 |
| 2,310,418 | 2/43 | Ghertzmann | 197—133 |
| 2,498,578 | 2/50 | Reinnagel | 35—35.7 |
| 2,677,540 | 5/54 | Metzner | 197—133 |
| 2,915,833 | 12/59 | Genest | 35—48 |
| 2,987,828 | 6/61 | Skinner | 35—9 |
| 3,056,215 | 10/62 | Skinner | 35—9 |

JEROME SCHNALL, *Primary Examiner.*

A. BERLIN, *Examiner.*